UNITED STATES PATENT OFFICE.

GEORGE CUTLER WESTBY, OF MURRAY, UTAH.

METHOD OF THIONOUS PRECIPITATION.

No. 923,916.  Specification of Letters Patent.  Patented June 8, 1909.

Application filed May 22, 1906. Serial No. 318,240.

*To all whom it may concern:*

Be it known that I, GEORGE CUTLER WESTBY, a citizen of the United States of America, and a resident of Murray, in the county of Salt Lake, State of Utah, have invented a new and useful Improvement in Methods of Thionous Precipitation, of which the following is a specification.

My invention relates to an improvement in methods of precipitating copper and silver from their solutions and particularly to a method of precipitating the same by means of thionites and thionates of iron.

I have discovered that where thionates or thionites of iron are brought into contact with solutions containing copper and silver, a precipitation of the copper and silver may be effected in a commercial way, thereby saving a large amount of labor and expense in the metallurgical operations connected with the production of these salts. The method of producing the solution of thionous and thionic acids for use in this precipitation is immaterial, but I have also discovered that where a solution of thionous or thionic acids or their salts is developed by treating slags, ferrous-sulfid, iron or oxidized ores with sulfurous acids or sulfur smoke scrubbing liquor, a very great saving of expense results. By the words thionous acids I means to imply a group of acids, such as thiosulfuric ($H_2S_2O_3$), and hyposulfurous, ($H_2SO_2$) as mentioned in the chemistry of Prescott & Johnson or $HSO_2$ of Roscoe & Schorlemmer, or the possible thionous acid $H_2S_3O_2$ of Mendelieff. The oxids of iron used are those found in nature. Their precise chemical nature such as hematite, limonite, oxids of iron derived from these minerals by atmospheric action, those silicates of iron which are easily attacked by weak oxids and which might form oxids of iron in decomposition, and generally all oxids and hydroxids of iron excepting $Fe_3O_4$ cannot be definitely specified for there are a great many indefinite compounds of $Fe_2O_3$ and $H_2O$, and certain chemists affirm that there are no two definite compounds of said substances. In the case of the non-hydrated oxids the difficulty of segregating the oxids lies in the fact that they are often mixed in the ores or materials I propose to use. Where slag is used for the production of this re-agent which is the cheapest method, I preferably blow the material into wool or otherwise finely divide it. It is then charged into barrels, vats or other receptacles, and a solution of sulfur dioxide or smoke scrubbing liquor is added, or I cause sulfur smoke to impinge on the material in the presence of water. In order to hasten the solution, the mixture may be agitated, and if desired, air may be used to modify the form of the thionite or thionate salt. After allowing the suspended matter to settle, the supernatant liquor is drawn off, and is added in a suitable receptacle to the solution of the metal to be precipitated, and the mixed solution is heated to any required temperature. Where iron sulfid or oxidized ore is used to produce the reagent the same general course is pursued, but the form of the precipitating agent is necessarily changed to some extent. Thus, for example, in place of thio-sulfate, a trithionate or a pentathionate may result, or in fact a general variation in the mixture of different thionites or thionates, as the thionites or thionates may vary from time to time by reason of incidental oxidation, composition of ore or of the material used, or other changing conditions. The constitution of these salts will also depend upon the kind of sulfurous liquor used, the effect of the atmospheric action upon the material, as well as the activity of secondary reactions in the mass, due in general to nascent sulfur arising from the decomposition of the more unstable products and the temperature of the solution. After the supernatant liquor has been drawn off, the metal precipitated is removed and treated in any convenient way.

I am aware that sodium and calcium thiosulfates have been used as laboratory and commercial agents principally for dissolving, but I believe it to be new to use ferric thionites and thionates for purposes of precipitation, and also new to produce them by means of utilizations of the waste products above described.

I claim as my invention:

1. The hereinbefore described method of precipitating copper or silver from their solutions by means of the addition of a liquor containing thio salts of iron.

2. The hereinbefore described method of precipitating copper and silver from their solutions, which consists in treating substances containing iron in which the iron is soluble in or capable of being attacked by sulfur dioxid, with a solution of sulfur dioxid, whereby a liquor containing thio salts of iron is formed, and in adding such liquor to the solution containing copper and silver whereby these metals are precipitated therefrom.

3. The hereinbefore described method of precipitating copper and silver from their solutions, which consists in treating iron with a solution of sulfur dioxid whereby a liquor containing thio salts of iron is formed, and in adding such liquor to the solution containing copper and silver whereby these metals are precipitated therefrom.

4. The hereinbefore described method of precipitating copper and silver from their solutions, which consists in treating substances containing iron in which the iron is soluble in or capable of being dissolved in sulfurous liquor derived from smelter smoke, with such liquor whereby a liquid containing thio salts of iron is formed, and in adding such liquor to the solution containing copper and silver whereby these metals are precipitated therefrom.

5. The hereinbefore-described method of precipitating copper and silver from their solutions, which consists in treating iron with the sulfurous liquor derived from smelter smoke, whereby a liquor containing thio-salts of iron is formed, and in adding such liquor to the solution containing copper and silver, whereby these metals are precipitated therefrom.

6. The hereinbefore described method of precipitating copper and silver from their solutions, which consists in treating salts of iron substantially of the character described soluble in or capable of being attacked by sulfur dioxid, with solutions developed from the sulfurous liquor derived from smelter smoke whereby a liquor containing thio salts of iron is formed, and in adding such liquor to the solution containing copper and silver whereby these metals are precipitated therefrom.

7. The hereinbefore described method of precipitating copper and silver from their solution, which consists in treating salts of iron substantially of the character described soluble or capable of being attacked by sulfur dioxid, with solutions developed by the addition of sulfurous acid to substances containing oxid of iron soluble in sulfur dioxid solutions whereby a liquor containing thio salts of iron is formed, and in adding such liquor to the solution containing copper and silver whereby these metals are precipitated therefrom.

In testimony, that I claim the foregoing as my invention, I have signed my name in presence of two witnesses, this 16th day of May 1906.

GEORGE CUTLER WESTBY.

Witnesses:
J. R. HAAS,
WALDEMAR VAN COTT.